(12) United States Patent
Huang et al.

(10) Patent No.: US 7,425,991 B2
(45) Date of Patent: Sep. 16, 2008

(54) SYSTEM AND METHOD FOR DETERMINING VIDEO SUBCARRIER PHASE

(75) Inventors: Wen Huang, San Jose, CA (US); Brad Delanghe, Sunnyvale, CA (US); Aleksandr Movshovich, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 586 days.

(21) Appl. No.: 11/200,343

(22) Filed: Aug. 8, 2005

(65) Prior Publication Data

US 2007/0030352 A1   Feb. 8, 2007

(51) Int. Cl.
*H04N 9/45* (2006.01)
*H04N 17/02* (2006.01)

(52) U.S. Cl. .................................. 348/505; 348/194

(58) Field of Classification Search ................ 348/505, 348/507, 508, 531, 725–728, 497, 194; *H04N 17/00, H04N 7/00, 9/45, 5/10, 5/44, 5/455, 17/02*
See application file for complete search history.

(56) References Cited

U.S. PATENT DOCUMENTS 4,933,765 A * 6/1990 Schiff et al. ................. 348/474
6,833,875 B1 * 12/2004 Yang et al. .................. 348/505

* cited by examiner

*Primary Examiner*—Sherrie Hsia
(74) *Attorney, Agent, or Firm*—McAndrews, Held & Malloy, Ltd.

(57) ABSTRACT

A system and method for determining phase of a subcarrier (e.g., a jittering video subcarrier). Various aspects of the present invention may comprise determining at least one weighting factor based, at least in part, on a subcarrier synchronization signal (e.g., a video synchronization signal). A first subcarrier phase sample and at least a second subcarrier phase sample may then be obtained. Subcarrier phase may then be determined by interpolating between the first subcarrier phase sample and the second subcarrier phase sample, where such interpolation (e.g., linear interpolation) may be based, at least in part, on the determined weighting factor(s).

27 Claims, 5 Drawing Sheets

SYSTEM AND METHOD FOR DETERMINING VIDEO SUBCARRIER PHASE

CROSS-REFERENCE TO RELATED APPLICATIONS/INCORPORATION BY REFERENCE

[Not Applicable]

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

In various communication systems, a subcarrier may be modulated to communicate information. For example and without limitation, in a video communication system, video information may be communicated by phase-modulating a subcarrier. For example, the NTSC and PAL video standards include communicating color (or chroma) information by phase-modulating a subcarrier. In such systems, determining phase of the subcarrier (e.g., the reference subcarrier and/or modulated subcarrier) is generally part of the process of demodulating the subcarrier to obtain the communicated information.

During communication, subcarrier phase may be adversely affected by any of a number of factors (e.g., resulting in subcarrier jitter). For example and without limitation, interference by other communication signals (e.g., wired or wireless signals) may alter the subcarrier phase. Also for example, natural or manmade physical obstacles and/or non-communication signals emanating from natural or manmade systems may alter the subcarrier phase.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method for determining phase of a subcarrier (e.g., a jittering video subcarrier), substantially as shown in and/or described in connection with at least one of the figures, as set forth more completely in the claims. These and other advantages, aspects and novel features of the present invention, as well as details of illustrative aspects thereof, will be more fully understood from the following description and drawings.

DETAILED DESCRIPTION OF THE INVENTION

Figure 1:
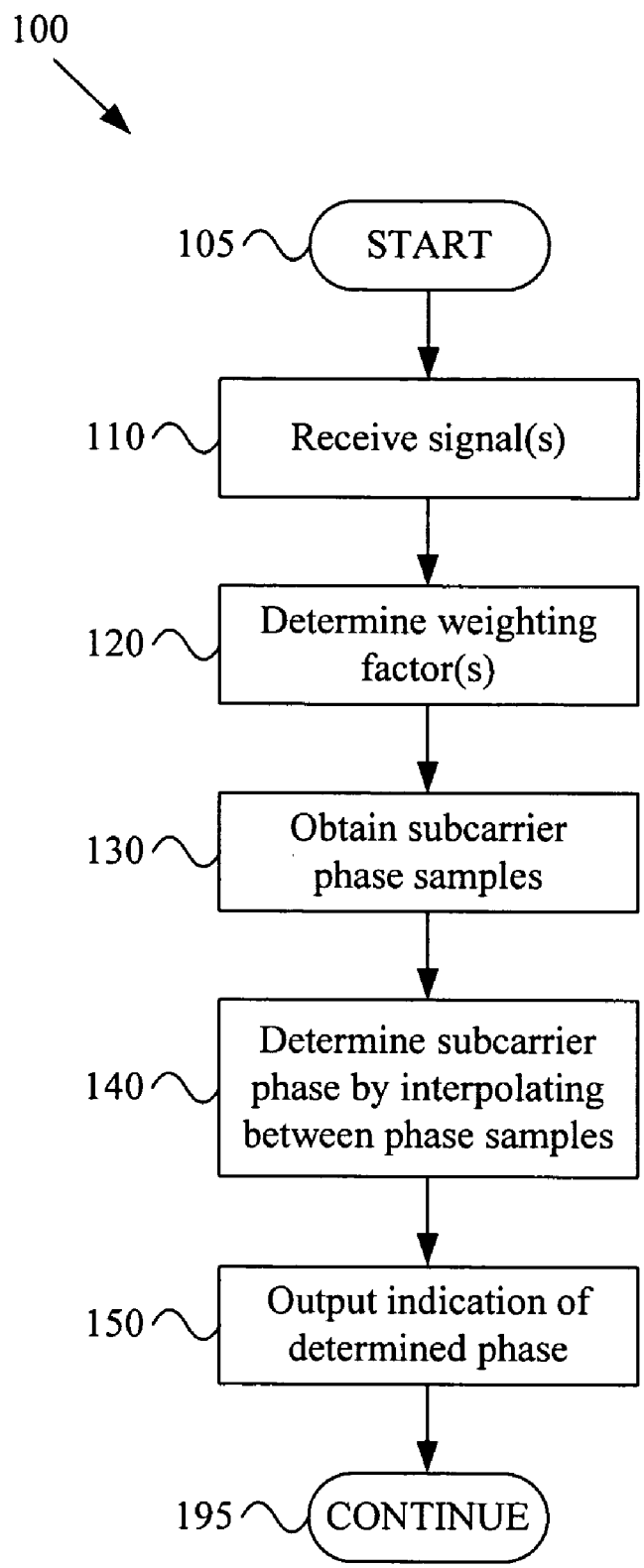
FIG. 1 is a diagram illustrating a method for determining subcarrier phase, in accordance with various aspects of the present invention.

FIG. 1 is a diagram illustrating a method 100 for determining subcarrier phase, in accordance with various aspects of the present invention. The exemplary method 100 may be implemented in any of a variety of systems where a determination of subcarrier phase is beneficial. For example and without limitation, the exemplary method 100 may be implemented in a video signal decoder chip or module. Also for example, the exemplary method 100 may be implemented in a chroma demodulator (and/or other components) of a composite video signal decoder. Accordingly, the scope of various aspects of the present invention should not be limited by characteristics of a particular signal type or particular signal-processing system.

The exemplary method 100 may begin executing at step 105. The exemplary method 100 (and other exemplary methods discussed herein) may begin executing for any of a variety of reasons. For example and without limitation, the method 100 may begin executing in response to a system implementing the method 100 being reset or powered up. Also for example, the method 100 may begin executing in response to arrival of a signal (e.g., a video signal) at a system implementing the method 100. Further for example, the method 100 may begin executing in response to a command received by a user or another system. Accordingly, the scope of various aspects of the present invention should not be limited by characteristics of any particular initiating cause or condition.

The exemplary method 100 may, at step 110, comprise receiving one or more signals. Such one or more signals may comprise characteristics of any of a variety of signal types. For example and without limitation, such a signal may comprise characteristics of a video signal or a suite of video signals. In a non-limiting exemplary scenario, such a signal may comprise characteristics of a composite video signal. Such a composite video signal may comprise components corresponding to frames (or fields) of video lines, with each frame (or field) comprising a vertical synchronization (vsync) signal and each line comprising a horizontal synchronization (hsync) signal, color burst signal (or subcarrier burst signal, subcarrier reference signal, etc.) and an active video information portion.

Step 110 may comprise receiving such one or more signals in any of a variety of manners. For example and without limitation, step 110 may comprise receiving a signal from a wired communication system. Such a wired communication system may, for example, comprise a cable television system, wired computer network (e.g., the Internet, a LAN, a PAN, etc.), wired telecommunication system, etc. Further for example, step 110 may comprise receiving a signal from a RF communication system. Such a RF communication system may, for example, comprise a terrestrial RF or satellite television communication system, RF-based computer network, RF-based telecommunication system, etc.

In general, step 110 may comprise receiving one or more signals (e.g., a composite video signal). Accordingly, the scope of various aspects of the present invention should not be limited by characteristics of any particular type of signal or by any particular manner of receiving such a signal.

The exemplary method 100 may, at step 120, comprise determining one or more weighting factors based, at least in part, on a synchronization signal (e.g., a video synchronization signal). Such a synchronization signal may, for example, comprise at least a portion of the signal received at step 110. For example and without limitation, such a synchronization signal may comprise a video synchronization signal. Also for example, such a synchronization signal may comprise a horizontal synchronization portion of a composite video signal. For example, in a non-limiting exemplary scenario where step 110 comprises receiving a composite video signal, the synchronization signal may comprise an hsync signal (or a plurality of hsync signals) of the received composite video signal. The scope of various aspects of the present invention should not be limited by characteristics of any particular type of synchronization signal.

The weighting factor(s) may comprise any of a variety of weighting factor characteristics. For example and without limitation, the weighting factor(s) may correspond to one or subsample fractions, which may, for example, be utilized to interpolate between subcarrier or subcarrier phase samples. For example, the weighting factor(s) may correspond to weights (or weighting coefficients), which may be utilized to linearly interpolate between two or more subcarrier or subcarrier phase samples. Also for example, the weighting factor(s) may correspond to weights, which may be utilized to perform non-linear interpolation or splining between subcarrier or subcarrier phase samples. The scope of various aspects of the present invention should not be limited by characteristics of any particular type of weighting factor.

Step 120 may comprise determining the weighting factor(s) based, at least in part, on a synchronization signal in any of a variety of manners. For example and without limitation, step 120 may comprise sampling the synchronization signal at a plurality of locations and determining the weighting factor(s) based, at least in part, on the plurality of samples.

Portions of the following discussion will exemplify various aspects of the present invention in the context of a non-limiting exemplary scenario involving a synchronization signal comprising video hsync signal characteristics and weighting factors comprising subsample fraction characteristics. Note, however, that the scope of various aspects of the present invention should not be limited by characteristics of video hsync signals and/or subsample fractions.

In a non-limiting exemplary scenario, where the synchronization signal comprises a horizontal synchronization signal of a video line, step 120 may comprising obtaining at least first and second samples of the hsync signal. Such samples may, for example, correspond to different sides of a signal level threshold (e.g., a slice level). Step 120 may then, for example, comprise determining a first difference between the first hsync sample and the threshold and a second difference between the second hsync sample and the threshold. Step 120 may then, for example, comprise determining one or more weighting factors based, at least in part, on the first difference and the second difference. In an exemplary implementation where step 120 comprises determining more than two samples, step 120 may, for example, comprise determining the weighting factor(s) based on more than the first and second synchronization signal samples.

Continuing the non-limiting exemplary scenario, step 120 may comprise determining the weighting factor(s) based on subsample fraction(s). For example, step 120 may comprise determining a sum of the first and second differences, and determining a first ratio between one of the first and second differences and the sum of the first and second differences. Step 120 may then, for example, comprise determining a second ratio between the other of the first and second differences and the sum of the first and second differences (which, may, in various scenarios be equivalent to one minus the first ratio).

Step 120 may generally comprise determining one or more weighting factors based, at least in part, on a synchronization signal (e.g., a video synchronization signal). Accordingly, the scope of various aspects of the present invention should not be limited by characteristics of any particular manner of determining such weighting factor(s).

The exemplary method 100 may, at step 130, comprise sampling the subcarrier phase (e.g., the video subcarrier phase). Such subcarrier phase may, for example, correspond to subcarrier phase of a composite video signal received at step 110. For example and without limitation, step 130 may comprise sampling a video subcarrier phase (e.g., during a chroma burst period in a signal corresponding to a video line). In a non-limiting exemplary scenario, step 130 may comprise obtaining at least a first subcarrier phase sample and a second subcarrier phase sample. Such first and second subcarrier phase samples may, for example, be adjacent subcarrier phase samples. Such first and second subcarrier phase samples may, for example, be separated by a sample period corresponding to the sample rate at which the subcarrier phase is typically sampled. Also for example, step 130 may comprise sampling the subcarrier phase at any rate, typical or atypical.

Step 130 may comprise sampling the subcarrier phase in any of a variety of manners. For example and without limitation, step 130 may comprise sampling a signal indicative of subcarrier phase. Such a signal may, for example and without limitation, comprise a locally generated subcarrier phase signal. As a non-limiting example, such a subcarrier phase signal may, for example, be based on nominal phase and an offset phase indicative of a locally generated phase and carrier phase of an incoming stream. Alternatively for example, step 130 may comprise sampling a subcarrier (or other signal representative thereof) and determining the phase.

In general, step 130 may comprise sampling the subcarrier phase. Accordingly, the scope of various aspects of the present invention should not be limited by characteristics of any particular manner of sampling subcarrier phase.

The exemplary method 100 may, at step 140, comprise determining subcarrier phase by, at least in part, interpolating between a first subcarrier phase sample and a second subcarrier phase sample (e.g., wherein the interpolating is based, at least in part, on the weighting factor(s) determined at step 120). Such interpolation may, for example, comprise linear interpolation. Alternatively, for example such interpolation may comprise non-linear interpolation or splining. Accordingly, the scope of various aspects of the present invention should not be limited by characteristics of a particular type of interpolation.

As discussed previously, step 120 may comprise determining one or more weighting factors, and step 130 may comprise obtaining samples of subcarrier phase. In a non-limiting exemplary scenario, step 140 may comprise forming a first partial product based, at least in part, on a first weighting factor ($WF_1$) and a first subcarrier phase sample ($Ph_1$) (e.g., $WF_1*Ph_1$). Step 140 may also, for example, comprise forming a second partial product based, at least in part, on a second weighting factor ($WF_2$) and a second subcarrier phase sample ($Ph_2$) (e.g., $WF_2*Ph_2$). Note that the second weighting factor ($WF_2$) may itself be based, at least in part, on the first weighting factor ($WF_1$) (e.g., $WF_2=1-WF_1$). In other words, the second partial product may also be based, at least in part, on the first weighting factor ($WF_1$). Step 140 may then, for example, comprise determining a sum of the first and second partial products, which may be representative of the true phase of the subcarrier.

Step 140 may further, in various non-limiting exemplary scenarios, comprise adjusting various values (e.g., subcarrier phase sample values) during the subcarrier phase determination. For example and without limitation, as mentioned previously, step 140 may comprise interpolating between subcarrier phase samples, where such interpolating may comprise calculating a sum of partial products. During the interpolating process, step 140 may comprise adjusting subcarrier phase sample values to maintain integrity of the subcarrier phase calculation. Such adjustment may, for example, be utilized when interpolating between phase points on either side of a discontinuity in the phase measurement scale (e.g., where phase is measured from 0 to 360 degrees). Such a phase measurement discontinuity may, for example, occur at a boundary near a zero phase point (e.g., between 359 degrees and 1 degree). As a non-limiting example, consider a previous phase sample of approximately 340 degrees and a current phase sample of approximately 20 degrees. Depending on the manner of phase determination, the 40 degree phase difference moving positively from 340 degrees to 20 degrees (e.g., crossing the 360 degree boundary) may, in fact, look like a −320 degree difference (i.e., 20-340). To enhance integrity of various phase determinations, it may be desirable to, for example, add 360 degrees to the current phase sample. In the non-limiting example, the current phase sample of approximately 20 degrees may be adjusted to 380 degrees or, alternatively, the previous phase sample of approximately 340 degrees may be adjusted to −20 degrees.

In an exemplary scenario involving such value adjustment, step 140 may comprise determining whether the previous phase sample is greater than the current phase sample. In such a scenario, if step 140 determines that the previous phase sample is greater than the current phase sample, then step 140 may comprise adjusting the current phase sample value (or alternatively, the previous phase sample value) to properly reflect the scope of difference between the previous and current phase samples (e.g., to make the current phase sample value greater than the previous phase sample value). For example, step 140 may comprise adding 360 degrees to the current phase sample or subtracting 360 degrees from the previous phase sample.

In general, step 140 may comprise determining video subcarrier phase by, at least in part, interpolating between a first subcarrier phase sample and a second subcarrier phase sample. Accordingly, the scope of various aspects of the present invention should not be limited by characteristics of any particular type of interpolation. Additionally, step 140 may comprise adjusting various values and performing any of a large variety of data manipulations during the determination of subcarrier phase. Accordingly, the scope of various aspects of the present invention should not be limited by characteristics of any particular value adjustment, data manipulation, boundary condition processing, etc.

The exemplary method 100 may, at step 150, comprise outputting an indication of the determined subcarrier phase. Step 150 may comprise outputting an indication of subcarrier phase in any of a variety of manners to any of a variety of destinations. For example and without limitation, step 150 may comprise outputting an analog or digital signal representative of the determined subcarrier phase. Also for example, step 150 may comprise storing a value indicative of the subcarrier phase in a register. Step 150 may, for example, comprise outputting the indication of the determined subcarrier phase to circuitry that may utilize the determined subcarrier phase for demodulation. For example, in a non-limiting scenario involving the determination of the chroma subcarrier in a composite video signal, step 150 may comprise outputting an indication of the determined subcarrier phase to chroma demodulation circuitry. Accordingly, the scope of various aspects of the present invention should not be limited by any particular manner of communicating an indication of determined subcarrier phase or any particular destination for such an indication.

The exemplary method 100 may, at step 195, comprise performing continued processing. Such continued processing (e.g., at step 195 or other exemplary methods discussed herein) may comprise characteristics of any of a variety of continued processing. For example and without limitation, step 195 may comprise utilizing the subcarrier phase determined at step 140 to perform subsequent signal processing (e.g., video signal processing). For example, step 195 may comprise utilizing the subcarrier phase determined at step 140 to demodulate a phase-modulated chroma signal.

Further for example, step 195 may comprise directing execution flow of the exemplary method 100 back up to step 110 for continued subcarrier phase determination for one or more received signals. In general, step 195 may comprise performing continued processing. Accordingly, the scope of various aspects of the present invention should not be limited by characteristics of any particular type of continued processing.

The exemplary method 100 illustrated in FIG. 1 and discussed previously was presented to provide a non-limiting illustration of various generally broader aspects of the present invention. Accordingly, the scope of various aspects of the present invention should not be limited by particular characteristics of the exemplary method 100.

Figure 2:
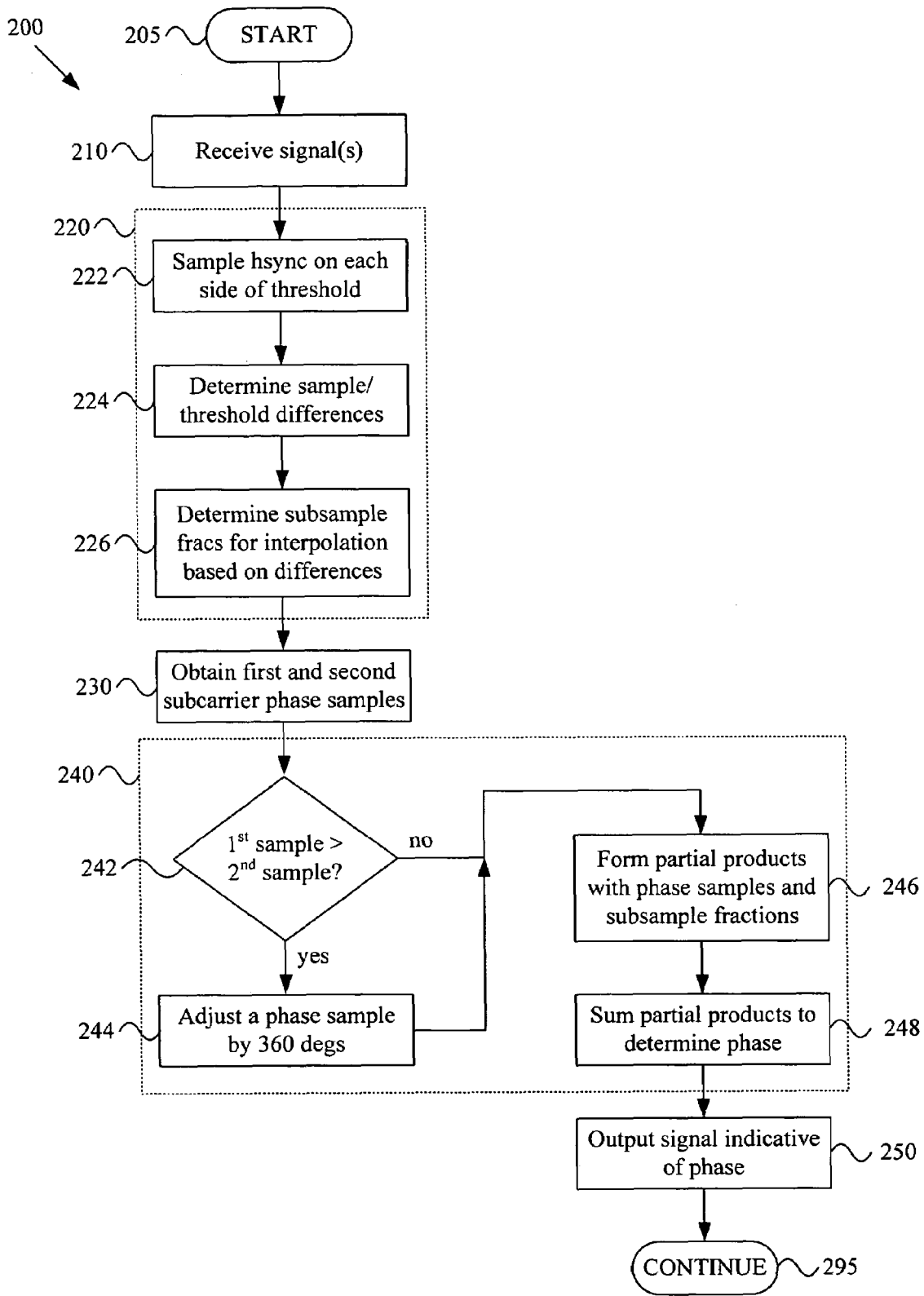
FIG. 2 is a diagram illustrating a method for determining subcarrier phase, in accordance with various aspects of the present invention.

FIG. 2 is a diagram illustrating a method 200 for determining subcarrier phase, in accordance with various aspects of the present invention. The exemplary method 200 may, for example and without limitation, share various characteristics with the method 100 illustrated in FIG. 1 and discussed previously.

Figure 6:
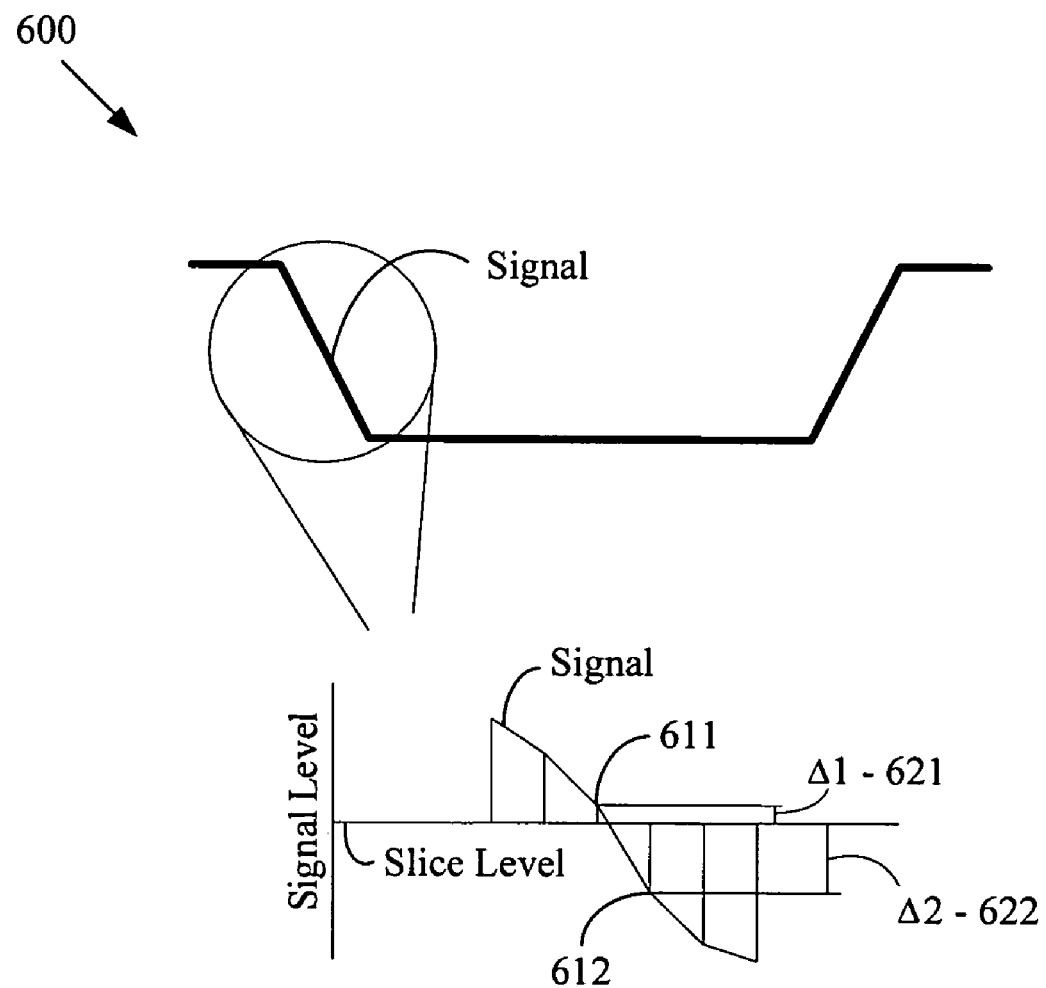
FIG. 6 illustrates a sampled video horizontal synchronization signal, in accordance with various aspects of the present invention.

The following non-limiting exemplary scenario will occasionally refer to FIG. 6, which illustrates a sampled exemplary video hsync signal 600. Note that FIG. 6 represents a non-limiting example of one type of synchronization signal that may be utilized. Accordingly, the scope of various aspects of the present invention should not be limited by characteristics of the illustration in FIG. 6 or by characteristics of video hsync signals.

The exemplary method 200 may, at step 210, comprise receiving one or more signals. Step 210 may, for example and without limitation, share various characteristics with step 110 of the exemplary method 100 illustrated in FIG. 1 and discussed previously. Step 210 may, for example, comprise receiving a composite video signal.

The exemplary method 200 may, at step 220, comprise determining one or more weighting factors based, at least in part, on a synchronization signal (e.g., a video synchronization signal). Step 220 may, for example and without limitation, share various characteristics with step 120 of the exemplary method 100 illustrated in FIG. 1 and discussed previously. Step 220 is illustrated in FIG. 2 with exemplary sub-steps 222, 224 and 226 for the purpose of non-limiting illustration.

The exemplary method 200 may, at step 222, comprise sampling a horizontal synchronization (hsync) signal on each side of a threshold (e.g., a slice level). Such an hsync signal may, for example, correspond to a portion of a composite video signal received at step 210.

For example, step 222 may comprise obtaining a first hsync sample on a first side of a slice level and a second hsync sample on a second side of the slice level. FIG. 6 illustrates an exemplary first hsync sample 611 and an exemplary second hsync sample 612. Note that the first hsync sample 611 is illustrated at a signal level higher than the slice level, and the second hsync sample 612 is illustrated at a signal level lower than the slice level.

The exemplary method 200 may, at step 224, comprise determining a first difference between the first hsync sample and the threshold and a second difference between the second hsync sample and the threshold. FIG. 6 illustrates an exemplary first difference ($Delta_1$) 621 and an exemplary second difference ($Delta_2$) 622. Note that the difference may, in various exemplary scenarios, be expressed as a difference magnitude (e.g., always positive).

The exemplary method 200 may, at step 226, comprise determining one or more weighting factors based, at least in part, on the first difference and the second difference. For example and without limitation, such weighting factors may comprise characteristics of subsample fractions based on the differences determined at step 224. For example, step 226 may comprise determining a first subsample fraction ($SSF_1 = Delta_1/(Delta_1 + Delta_2)$). Also for example, step 226 may comprise determining a second subsample fraction ($SSF_2 = Delta_2/(Delta_1 + Delta_2)$ or $SSF_2 = 1 - SSF_1$).

The exemplary method 200 may, at step 230, comprise sampling subcarrier phase. Step 230 may, for example and without limitation, share various characteristics with step 130 of the exemplary method 100 illustrated in FIG. 1 and discussed previously. For example, step 230 may comprise sampling phase of a chroma burst signal of a composite video signal. Alternatively, for example, step 230 may comprise sampling phase of a locally generated signal that generally tracks such a chroma burst signal. For example, step 230 may comprise obtaining a previous subcarrier phase sample $Phase_1$ and a current subcarrier phase sample $Phase_2$.

The exemplary method 200 may, at step 240, comprise determining video subcarrier phase by, at least in part, interpolating between a first subcarrier phase sample and a second subcarrier phase sample. For example, step 240 may comprise interpolating between $Phase_1$ and $Phase_2$ (e.g., as obtained at step 230). Step 240 is illustrated in FIG. 2 with exemplary sub-steps 242, 244, 246 and 248 for the purpose of non-limiting illustration.

The exemplary method 200 may, at step 242, comprise determining whether $Phase_1$ is greater than $Phase_2$, and directing execution flow of the method 200 based on such determination. For example, if $Phase_1$ is greater than $Phase_2$, then step 242 may comprise directing execution flow of the exemplary method 200 to step 244, which may comprise adding 360 degrees (or an equivalent thereof) to $Phase_2$. Alternatively for example, if $Phase_1$ is not greater than $Phase_2$, then step 242 may comprise directing execution flow of the method 200 to step 246.

The exemplary method 200 may, at step 246, comprise forming partial products of corresponding weighting factors (e.g., sub-sample fractions as determined at step 220) and subcarrier phase samples (e.g., as determined at step 230). For example, step 246 may comprise forming a first partial product ($PP_1 = SSF_1 * Phase_1$) and a second partial product ($PP_2 = SSF_2 * Phase_2$).

The exemplary method 200 may, at step 248, comprise determining an actual subcarrier phase based, at least in part, on the partial products formed at step 246. For example, step 248 may comprise calculating an actual phase ($Phase_{actual} = PP_1 + PP_2$).

In general, step 240 may comprise determining subcarrier phase by, at least in part, interpolating between a first subcarrier phase sample and a second subcarrier phase sample. Accordingly, the scope of various aspects of the present invention should not be limited by characteristics of the non-limiting illustrative sub-steps 242, 244, 246 and 248.

The exemplary method 200 may, at step 250, comprise outputting an indication of the determined sub-carrier phase. Step 250 may, for example and without limitation, share various characteristics of step 150 of the exemplary method 100 illustrated in FIG. 1 and discussed previously.

The exemplary method 200 may, at step 295, comprise performing continued processing. Step 295 may, for example and without limitation, share various characteristics with step 195 of the exemplary method 100 illustrated in FIG. 1 and discussed previously. Step 295 may, for example, comprise directing execution flow of the method 200, along flow path 296, back up to step 230 for continued subcarrier phase sampling and phase determination. Also for example, step 295 may comprise directing execution flow of the method 200, along flow path 297, back up to step 220 for determination of a new set of weighting factors (e.g., for a next line, field or frame of video information).

The exemplary method 200 illustrated in FIG. 2 and discussed previously was presented to provide a non-limiting example of a portion of various aspects of the present invention. Accordingly, the scope of various aspects of the present invention should not be limited by particular characteristics of the exemplary method 200.

Figure 3:
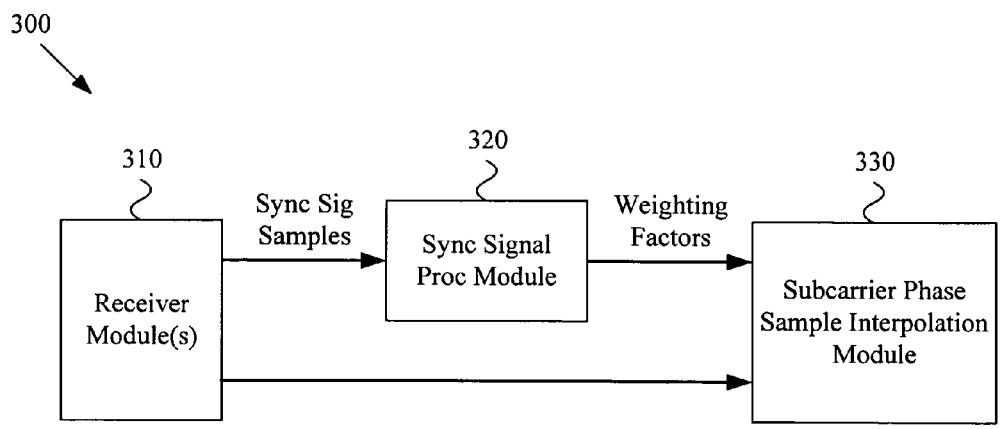
FIG. 3 is a diagram illustrating a system for determining subcarrier phase, in accordance with various aspects of the present invention.

FIG. 3 is a diagram illustrating a system 300 for determining subcarrier phase, in accordance with various aspects of the present invention. The system 300 may, for example and without limitation, share various functional characteristics with the exemplary methods 100, 200 illustrated in FIGS. 1-2 and discussed previously.

The exemplary system 300 may be implemented in any of a variety of systems. For example and without limitation, the system 300 may be integrated in a signal decoder. For example, the system 300 may be implemented in a video decoder module. In a non-limiting exemplary scenario, the system 300 may be implemented in chroma demodulation circuitry of a video decoder. For example, the system 300 may be implemented in an integrated circuit, television, computer, cable box, satellite television receiver, etc. The scope of various aspects of the present invention should not be limited by characteristics of a particular system implementation.

The exemplary system 300 may comprise one or more signal receiver modules 310, a sync signal-processing module 320 and a subcarrier sample interpolation module 330. The names of the various modules were generally chosen for illustrative clarity and should by no means limit the scope of various aspects of the present invention. Additionally, various modules may be implemented in hardware, software or a combination thereof. Further, various modules may share various sub-modules, sub-components, sub-routines, etc. Accordingly, the scope of various aspects of the present invention should not be limited by characteristics of particular module names, hardware or software implementations, or arbitrary boundaries between modules.

The signal receiver module(s) 310 may generally be adapted to receive one or more incoming signals. The signal receiver module(s) 310 may, for example and without limitation, share various functional characteristics with step 110 of the exemplary method 100 illustrated in FIG. 1 and step 210 of the exemplary method 200 illustrated in FIG. 2.

For example, the signal receiver module(s) 310 may be adapted to receive one or more signals. Such one or more signals may comprise characteristics of any of a variety of signal types. For example and without limitation, such a signal may comprise characteristics of a video signal or a suite of video signals. In a non-limiting exemplary scenario, such a signal may comprise characteristics of a composite video signal. Such a composite video signal may comprise components corresponding to frames (or fields) of video lines, with each frame (or field) comprising a vertical synchronization (vsync) signal and each line comprising a horizontal synchronization (hsync) signal, color burst signal (or subcarrier burst signal, subcarrier reference signal, etc.) and an active video portion.

The signal receiver module 310 may be adapted to receive such one or more signals in any of a variety of manners. For example and without limitation, the signal receiver module 310 may be adapted to receive a signal from a wired communication system. Such a wired communication system may, for example, comprise a cable television system, wired computer network (e.g., the Internet, a LAN, a PAN, etc.), wired telecommunication system, etc. Further for example, the signal receiver module 310 (or, for example, associated receiver circuitry) may be adapted to receive a signal from a RF communication system. Such a RF communication system may, for example, comprise a terrestrial RF or satellite television communication system, RF-based computer network, RF-based telecommunication system, etc.

In general, the signal receiver module 310 may be adapted to receive one or more signals. Accordingly, the scope of various aspects of the present invention should not be limited by characteristics of a particular signal or particular manner of, or mechanism for, receiving a signal.

The sync signal-processing module 320 may be adapted to determine a weighting factor based, at least in part, on a synchronization signal (e.g., a video synchronization signal). The sync signal-processing module 320 may, for example and without limitation, share various functional characteristics with step 120 of the exemplary method 100 illustrated in FIG. 1 and step 220 of the exemplary method 200 illustrated in FIG. 2.

For example, such a synchronization signal may comprise a video synchronization signal. Also for example, such a synchronization signal may comprise a horizontal synchronization portion of a composite video signal. For example, in a non-limiting exemplary scenario where the signal receiver module 310 receives a composite video signal, the synchronization signal may comprise an hsync signal (or a plurality of hsync signals) of the received composite video signal. The scope of various aspects of the present invention should not be limited by characteristics of any particular type of synchronization signal.

The weighting factor(s) may comprise any of a variety of weighting factor characteristics. For example and without limitation, the weighting factor(s) may correspond to one or more subsample fractions, which may, for example, be utilized to interpolate between subcarrier samples. For example, the weighting factor(s) may correspond to weights (or weighting coefficients), which may be utilized to linearly interpolate between two or more subcarrier samples. Also for example, the weighting factor(s) may correspond to weights, which may be utilized to perform non-linear interpolation or splining between subcarrier samples. The scope of various aspects of the present invention should not be limited by characteristics of any particular type of weighting factor.

The sync signal-processing module 320 may be adapted to determine the weighting factor(s) based, at least in part, on a synchronization signal in any of a variety of manners. For example and without limitation, the sync signal-processing module 320 may be adapted to sample the synchronization signal at a plurality of locations and determine the weighting factor(s) based, at least in part, on the plurality of samples.

Portions of the following discussion will exemplify various aspects of the present invention in the context of a non-limiting exemplary scenario involving a synchronization signal comprising video hsync signal characteristics and weighting factors comprising subsample fraction characteristics. Note, however, that the scope of various aspects of the present invention should not be limited by characteristics of the non-limiting exemplary scenario.

In a non-limiting exemplary scenario where the synchronization signal comprises a horizontal synchronization (hsync) signal of a video line, the sync signal-processing module 320 may be adapted to obtain at least first and second samples of the hsync signal. Such samples may, for example, correspond to different sides of a signal level threshold (e.g., a slice level). The sync signal-processing module 320 may then, for example, be adapted to determine a first difference between the first hsync sample and the threshold and a second difference between the second hsync sample and the threshold. The sync signal-processing module 320 may then, for example, be adapted to determine one or more weighting factors based, at least in part, on the first difference and the second difference. In an exemplary implementation where the sync signal-processing module 320 is adapted to determine more than two samples, the sync signal-processing module 320 may, for example, be adapted to determine the weighting factor(s) based on more than the first and second synchronization signal samples.

Continuing the non-limiting exemplary scenario, the sync signal-processing module 320 may be adapted to determine the weighting factor(s) based on subsample fraction(s). For example, the sync signal-processing module 320 may be adapted to determine a sum of the first and second differences, and determine a first ratio between one of the first and second differences and the sum of the first and second differences. The sync signal-processing module 320 may then, for example, be adapted to determine a second ratio between the other of the first and second differences and the sum of the first and second differences (which may, in various scenarios, be equivalent to one minus the first ratio).

In general, the sync signal-processing module 320 may be adapted to determine one or more weighting factors based, at least in part, on a synchronization signal (e.g., a video synchronization signal). Accordingly, the scope of various aspects of the present invention should not be limited by characteristics of any particular manner of, or mechanism for, determining such weighting factor(s).

The subcarrier sample interpolation module 330 may be adapted to obtain subcarrier phase samples. The subcarrier sample interpolation module 330 may, for example and without limitation, share various functional characteristics with step 130 of the exemplary method 100 illustrated in FIG. 1 and step 230 of the exemplary method 200 illustrated in FIG. 2.

For example, the subcarrier sample interpolation module 330 may be adapted to sample a signal representative of subcarrier phase (e.g. video subcarrier phase). For example and without limitation, the subcarrier sample interpolation module 330 may be adapted to sample a video subcarrier phase (e.g., during a chroma burst period in a signal corresponding to a video line). In a non-limiting exemplary scenario, the subcarrier sample interpolation module 330 may be adapted to obtain at least a first subcarrier phase sample and a second subcarrier phase sample. Such first and second subcarrier phase samples may, for example, be adjacent subcarrier phase samples. Such first and second subcarrier phase samples may, for example, be separated by a sample period corresponding to the sample rate at which the subcarrier phase is typically sampled. Also for example, the subcarrier sample interpolation module 330 may be adapted to sample the subcarrier phase at any rate, typical or atypical.

The subcarrier sample interpolation module 330 may be adapted to sample the subcarrier phase in any of a variety of manners. For example and without limitation, the subcarrier sample interpolation module 330 may be adapted to sample a signal indicative of subcarrier phase. Such a signal may, for example and without limitation, comprise a locally generated subcarrier phase signal (e.g., a digital or analog signal). As a non-limiting example, such a subcarrier phase signal may, for example, be based on nominal phase and an offset phase indicative of a locally generated phase and carrier phase of an incoming stream. Alternatively for example, the subcarrier sample interpolation module 330 may be adapted to sample a subcarrier (or other signal representative thereof) and determine the phase of the subcarrier.

In general, the subcarrier sample interpolation module 330 may be adapted to sample the subcarrier phase. Accordingly the scope of various aspects of the present invention should not be limited by characteristics of any particular manner of, or mechanism for, sampling subcarrier phase.

The subcarrier sample interpolation module 330 may also, for example, be adapted to determine subcarrier phase (e.g., video subcarrier phase) by, at least in part, interpolating between the first subcarrier phase sample and the second subcarrier phase sample. Such interpolating may, for example, be based, at least in part, on a weighting factor (e.g., as determined by the sync signal-processing module 320). The subcarrier sample interpolation module 330 may, for example and without limitation, share various functional characteristics with step 140 of the exemplary method 100 and step 240 of the exemplary method 200.

For example, the subcarrier sample interpolation module 330 may be adapted to determine subcarrier phase by, at least in part, interpolating between a first subcarrier phase sample and a second subcarrier phase sample (e.g., where the interpolating is based, at least in part, on the weighting factor(s) determined by the sync signal-processing module 320). Such interpolation may, for example, comprise linear interpolation. Alternatively, for example, such interpolation may comprise non-linear interpolation or splining. Accordingly, the scope of various aspects of the present invention should not be limited by characteristics of a particular type of interpolation.

As discussed previously, the sync signal-processing module 320 may be adapted to determine one or more weighting factors, and the subcarrier sample interpolation module 330 may be adapted to obtain samples of subcarrier phase. In a non-limiting exemplary scenario, the subcarrier sample interpolation module 330 may be adapted to form a first partial product based, at least in part, on a first weighting factor ($WF_1$) and a first subcarrier phase sample ($Ph_1$) (e.g., $WF_1*Ph_1$). The subcarrier sample interpolation module 330 may also, for example, be adapted to form a second partial product based, at least in part, on a second weighting factor ($WF_2$) and a second subcarrier phase sample ($Ph_2$) (e.g., $WF_2*Ph_2$). Note that the second weighting factor ($WF_2$) may itself be based, at least in part, on the first weighting factor ($WF_1$) (e.g., $WF_2=1-WF_1$). In other words, the second partial product may also be based, at least in part, on the first weighting factor ($WF_1$). The subcarrier sample interpolation module 330 may then, for example, be adapted to determine a sum of the first and second partial products, which may be representative of the true phase of the subcarrier.

The subcarrier sample interpolation module 330 may further, in various non-limiting exemplary scenarios, be adapted to adjust various values (e.g., subcarrier phase sample values) during subcarrier phase determination. For example and without limitation, as mentioned previously, the subcarrier sample interpolation module 330 may be adapted to interpolate between subcarrier phase samples, where such interpolating may comprise calculating a sum of partial products. During the interpolating process, the subcarrier sample interpolation module 330 may be adapted to adjust subcarrier phase sample values to maintain integrity of the subcarrier phase calculation. Such adjustment may, for example, be utilized when interpolating between phase points on either side of a discontinuity in the phase measurement scale (e.g., where phase is measured from 0 to 360 degrees). Such a phase measurement discontinuity may, for example, occur at a boundary near a zero phase point (e.g., between 359 degrees and 1 degree). As a non-limiting example, consider a previous phase sample of approximately 340 degrees and a current phase sample of approximately 20 degrees. Depending on the manner of phase determination, the 40 degree phase difference moving positively from 340 degrees to 20 degrees (e.g., crossing the 360 degree boundary) may, in fact, look like a –320 degree difference (i.e., 20-340). To enhance integrity of various phase determinations, it may be desirable to, for example, add 360 degrees to the current phase sample. In the non-limiting example, the current phase sample of approximately 20 degrees may be adjusted to 380 degrees or the previous phase sample of approximately 340 degrees may be adjusted to –20 degrees.

In an exemplary scenario involving such value adjustment, the subcarrier sample interpolation module 330 may be adapted to determine whether the previous subcarrier phase sample is greater than the current subcarrier phase sample. In such a scenario, if the subcarrier sample interpolation module 330 determines that the previous phase sample is greater than the current phase sample, then the subcarrier sample interpolation module 330 may be adapted to adjust the current phase sample value (or alternatively, the previous phase sample value) to properly reflect the scope of difference between the previous and current phase samples (e.g., to make the current phase sample value greater than the previous phase sample value). For example, the subcarrier sample interpolation module 330 may be adapted to add 360 degrees to the current phase sample or subtract 360 degrees from the previous phase sample.

In general, the subcarrier sample interpolation module 330 may be adapted to determine video subcarrier phase by, at least in part, interpolating between a first subcarrier phase sample and a second subcarrier phase sample. Accordingly, the scope of various aspects of the present invention should not be limited by characteristics of any particular type of interpolation. Additionally, the subcarrier sample interpolation module 330 may be adapted to adjust various values and perform any of a large variety of data manipulations during the determination of subcarrier phase. Accordingly, the scope of various aspects of the present invention should not be limited by characteristics of any particular value adjustment, data manipulation, boundary condition processing, etc.

The subcarrier sample interpolation module 330 may further, for example, be adapted to output an indication of the determined subcarrier phase. For example and without limitation, the subcarrier sample interpolation module 330 may share various functional characteristics with step 150 of the exemplary method 100 and step 250 of the exemplary method 200.

The exemplary system 300 illustrated in FIG. 3 and discussed previously was presented to provide a non-limiting exemplary illustration of various generally broader aspects of the present invention. Accordingly, the scope of various aspects of the present invention should not be limited by particular characteristics of the exemplary system 300.

Figure 4:
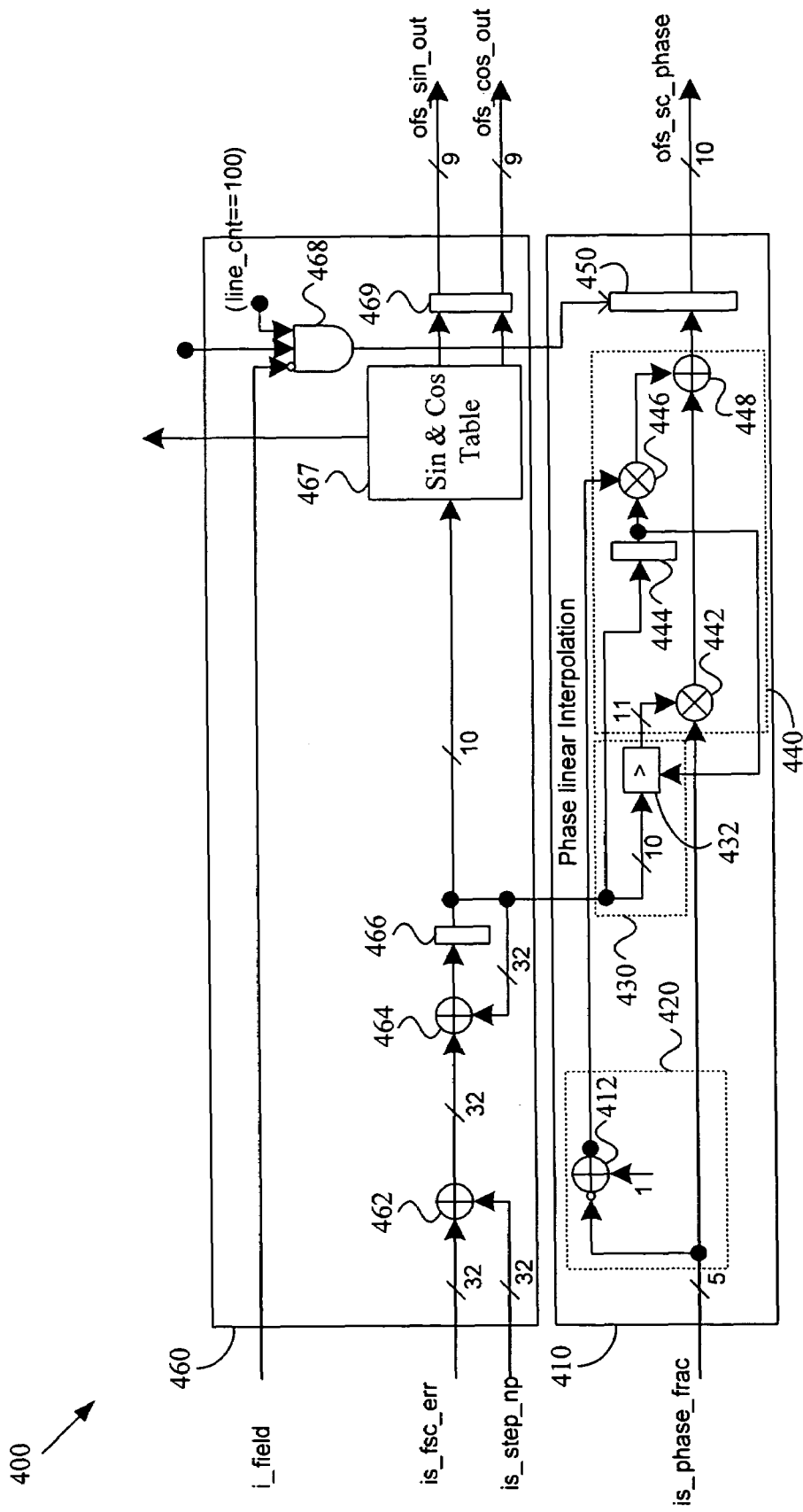
FIG. 4 is a diagram illustrating a system for determining subcarrier phase, in accordance with various aspects of the present invention.

FIG. 4 is a diagram illustrating a system 400 for determining subcarrier phase, in accordance with various aspects of the present invention. The exemplary system 400 may, for example and without limitation, share various characteristics with the exemplary system 300 illustrated in FIG. 3 and discussed previously. The exemplary system 400 may also, for example and without limitation, share various functional characteristics with the exemplary methods 100, 200 illustrated in FIGS. 1-2 and discussed previously.

The exemplary system 400 may comprise a signal generating module 460 and a subcarrier sample interpolation module 410. The signal-generating module 460 may, for example, be adapted to generate a locally generated subcarrier signal. Such a subcarrier signal may, for example, generally track the subcarrier of an incoming signal (e.g., a video signal).

The signal-generating module 460 may be adapted to receive an is_step_np_signal, which may comprise an indication of nominal subcarrier phase. The signal-generating module 460 may also, for example, be adapted to receive an is_fsc_err signal (e.g., from phase lock loop circuitry), which may indicate a difference between a locally generated phase and carrier phase in an incoming stream. First adder 462 may add is_fsc_err to is_step_np to determine a phase. The second adder 464 and the buffer 466 may work together as a phase accumulator loop to accumulate the phase indication output from the first adder 462. The phase accumulator loop may output the phase indication to waveform generation circuitry (e.g., a sine & cosine lookup table 467 and waveform output buffer 469). The phase accumulator loop may also output the phase indication to the subcarrier sample interpolation module 410. Such an output may, for example, represent sampled subcarrier phase.

As mentioned previously, the exemplary system 400 may comprise a subcarrier sample interpolation module 410, which may share various characteristics with the subcarrier sample interpolation module 330 of the exemplary system 300. Also, the subcarrier sample interpolation module 410 may share various functional characteristics with steps 130-150 of the exemplary method 100 and steps 230-250 of the exemplary method 200.

The subcarrier sample interpolation module 410 may, for example, receive signal is_phase_frac ($SSF_1$), which is indicative of a subsample fraction (e.g., determined in accordance with methods and systems discussed previously). A subtracter circuit 412 may receive $SSF_1$ as input and output a second subsample fraction $SSF_2=1-SSF_1$.

The subcarrier sample interpolation module 410 may comprise a phase-adjustment module 430 (e.g., including a comparator and adder circuitry), which receives a current phase sample from the signal-generating module 460 and a stored previous phase value (e.g., from buffer 444), and adds 360 degrees to the current phase sample if the current phase sample is less than the previous phase sample.

The subcarrier sample interpolation module 410 may also comprise a phase generating module 440 that generates a signal indicative of an actual subcarrier phase. For example, the phase generating module 440 may receive $SFF_1$ and the current phase sample ($Phase_1$) (which may have been adjusted by the phase-adjustment module 430) and utilize a first multiplier module 442 to generate a first partial product ($PP_1=SFF_1*Phase_1$). Also for example, the phase generating module 440 may be adapted to receive $SSF_2$ (e.g., as output from the weight determining module 420) and the previous subcarrier phase sample ($Phase_2$) and utilize a second multiplier 446 to generate a second partial product ($PP_2=SSF_2*Phase_2$). Further for example, the phase generating module 440 may be adapted to utilize a fourth adder 448 to generate a sum of the partial fractions, where the sum represents actual subcarrier phase. For example, $Phase_{actual}=(SSF_1*Phase_1)+(SSF_2*Phase_2)$, which may also, in this exemplary scenario, be written as $Phase_{actual}=(SSF_1*Phase_1)+((1-SSF_1)*Phase_2)$.

The subcarrier sample interpolation module 410 may also include an output buffer 450, which may output a signal indicative of subcarrier phase determined by the subcarrier sample interpolation module 410.

The exemplary system 400 illustrated in FIG. 4 and discussed previously was presented to provide a non-limiting exemplary illustration of various generally broader aspects of the present invention. Accordingly, the scope of various aspects of the present invention should not be limited by particular characteristics of the exemplary system 400.

Figure 5:
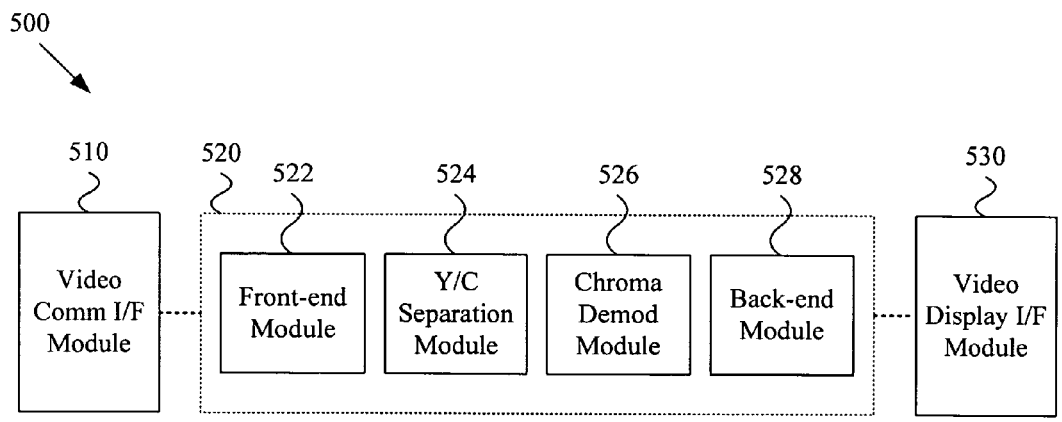
FIG. 5 is a diagram illustrating a system utilizing a system for determining subcarrier phase, in accordance with various aspects of the present invention.

FIG. 5 is a diagram illustrating a video system 500 utilizing a system for determining subcarrier phase, in accordance with various aspects of the present invention. The system 500 may, for example, comprise characteristics of any of a variety of system types.

The exemplary video system 500 may comprise a video communication interface module 510. The video communication interface module 510 may be adapted to receive any of a variety of types of video communication signals (e.g., wired or wireless signals). For example and without limitation, the video communication interface module 510 may be adapted to receive a composite video signal. Also for example, the video communication interface module 510 may be adapted to receive various other types of video signals (e.g., component video signals, digital video information streams, etc.). The scope of various aspects of the present invention should not be limited by characteristics of a particular type of video signal or a particular manner of, or mechanism for, receiving a particular type of video signal.

The exemplary system 500 may also comprise a video decoder module 520. The video decoder module 520 may, for example and without limitation, share various characteristics with the exemplary systems 300, 400 illustrated in FIG. 3-4 and may share various functional characteristics with the exemplary methods 100, 200 illustrated in FIGS. 1-2.

The exemplary video decoder module 520 may, for example, comprise a front-end module 522, Y/C separation module 524, chroma demod module 526 and a back end module 528. The front-end module 522 may, among other things, process synchronization information. In various non-limiting exemplary scenarios, the front-end module 522 may share various characteristics with the sync signal-processing module 320 of the exemplary system 300 illustrated in FIG. 3. Also, the front-end module 522 may share various functional characteristics with step 120 of the exemplary method 100 and step 220 of the exemplary method 200. For example, the front-end module 522 may be adapted to determine one or more weighting factors based, at least in part, on a synchronization signal.

The chroma demod module 526 may generally demodulate chroma signals (e.g., of a composite video signal). The chroma demod module 526 may share various characteristics with the subcarrier sample interpolation modules 330, 410 of the exemplary systems 300, 400 illustrated in FIGS. 3-4. The chroma demod module 526 may also, for example and without limitation, share various functional characteristics with steps 130 and 140 of the exemplary method 100 and steps 230 and 240 of the exemplary method 200. For example, the chroma demod module 526 may receive weighting factors generated by the front-end module 522 and utilize such weighting factors to determine video subcarrier phase. The chroma demod module 526 may, for example, utilize sub-sample fractions determined by the front-end module 522 to linearly interpolate between subcarrier samples.

The exemplary system 500 may further comprise a video display interface module 530. The video display interface module 530 may generally receive video information from other modules (e.g., the chroma demod module 526, a luma demod module, etc.) and generate one or more signals to drive a video display (e.g., a television display, computer display, communication device display, etc.).

The exemplary system 500 illustrated in FIG. 5 and discussed previously was presented to provide a non-limiting exemplary illustration of various generally broader aspects of the present invention. Accordingly, the scope of various aspects of the present invention should not be limited by particular characteristics of the exemplary system 500.

In summary, various aspects of the present invention provide a system and method for determining phase of a subcarrier (e.g., a jittering video subcarrier). While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method for determining video subcarrier phase, the method comprising:
    determining a weighting factor (WF) based, at least in part, on a video synchronization signal;
    obtaining a first subcarrier phase sample;
    obtaining a second subcarrier phase sample; and
    determining video subcarrier phase by, at least in part, interpolating between the first subcarrier phase sample and the second subcarrier phase sample, wherein the interpolating is based, at least in part, on the weighting factor.

2. The method of claim 1, wherein the weighting factor is a sub-sample fraction.

3. The method of claim 1, wherein the synchronization signal is a horizontal synchronization signal of a video line.

4. The method of claim 1, wherein determining a weighting factor comprises:
    sampling the synchronization signal at a plurality of locations; and
    determining the weighting factor based, at least in part, on the plurality of samples.

5. The method of claim 1, wherein the synchronization signal is a horizontal synchronization (hsync) signal of a video line, and determining a weighting factor comprises:
    obtaining first and second samples of the hsync signal on different respective sides of a threshold;
    determining a first difference between the first sample and the threshold;
    determining a second difference between the second sample and the threshold; and
    determining the weighting factor based on the first difference and the second difference.

6. The method of claim 5, wherein determining the weighting factor based on the first difference and the second difference comprises determining a sub-sample fraction by:
    determining a sum of the first and second differences; and
    determining a ratio between one of the first and second differences and the sum of the first and second differences.

7. The method of claim 1, wherein interpolating between the first subcarrier phase sample and the second subcarrier phase sample comprises linearly interpolating between the first subcarrier phase sample and the second subcarrier phase sample.

8. The method of claim 1, wherein the first subcarrier phase sample is one sample prior to the second subcarrier phase sample.

9. The method of claim 1, wherein determining video subcarrier phase comprises:
    forming a first partial product based, at least in part, on the first subcarrier phase sample and the weighting factor;
    forming a second partial product based, at least in part, on the second subcarrier phase sample and the weighting factor; and
    determining a sum comprising at least the first partial product and the second partial product.

10. The method of claim 1, wherein determining video subcarrier phase comprises:
    forming a first partial product based, at least in part, on ((1−WF)*the first subcarrier phase sample);
    forming a second partial product based, at least in part, on (WF*the second subcarrier phase sample); and
    determining a sum comprising the first partial product and the second partial product.

11. The method of claim 1, wherein determining video subcarrier phase comprises:
    comparing the second subcarrier phase sample and the first subcarrier phase sample; and
    if the first subcarrier phase sample is greater than the second subcarrier phase sample, then adjusting at least one of the first subcarrier phase sample and the second subcarrier phase sample such that the second subcarrier phase sample is greater than the first subcarrier phase sample.

12. The method of claim 11, wherein adjusting at least one of the first subcarrier phase sample and the second subcarrier phase sample comprises adding 360 degrees, or the equivalent thereof, to the second subcarrier phase sample.

13. In a video processing system, a sub-system for determining video subcarrier phase, the sub-system comprising at least one module adapted to:
    determine a weighting factor (WF) based, at least in part, on a video synchronization signal;
    obtain a first subcarrier phase sample;
    obtain a second subcarrier phase sample; and
    determine video subcarrier phase by, at least in part, interpolating between the first subcarrier phase sample and the second subcarrier phase sample, wherein the interpolating is based, at least in part, on the weighting factor.

14. The system of claim 13, wherein the weighting factor is a sub-sample fraction.

15. The system of claim 13, wherein the synchronization signal is a horizontal synchronization signal of a video line.

16. The system of claim 13, wherein the at least one module is adapted to:
sample the synchronization signal at a plurality of locations; and
determine the weighting factor based, at least in part, on the plurality of samples.

17. The system of claim 13, wherein the synchronization signal is a horizontal synchronization signal of a video line, and the at least one module is adapted to:
obtain first and second samples of the hsync signal on different respective sides of a threshold;
determine a first difference between the first sample and the threshold;
determine a second difference between the second sample and the threshold; and
determine the weighting factor based on the first difference and the second difference.

18. The system of claim 17, wherein the at least one module is adapted to:
determine a sum of the first and second differences; and
determine a ratio between one of the first and second differences and the sum of the first and second differences.

19. The system of claim 13, wherein the at least one module is adapted to linearly interpolate between the first subcarrier phase sample and the second subcarrier phase sample.

20. The system of claim 13, wherein the first subcarrier phase sample is one sample prior to the second subcarrier phase sample.

21. The system of claim 13, wherein the at least one module is adapted to:
form a first partial product based, at least in part, on the first subcarrier phase sample and the weighting factor;
form a second partial product based, at least in part, on the second subcarrier phase sample and the weighting factor; and
determine a sum comprising at least the first partial product and the second partial product.

22. The system of claim 13, wherein the at least one module is adapted to:
form a first partial product based, at least in part, on ((1−WF)*the first subcarrier phase sample);
form a second partial product based, at least in part, on (WF*the second subcarrier phase sample); and
determine a sum comprising the first partial product and the second partial product.

23. The system of claim 13, wherein the at least one module is adapted to:
compare the second subcarrier phase sample and the first subcarrier phase sample; and
if the first subcarrier phase sample is greater than the second subcarrier phase sample, then adjust at least one of the first subcarrier phase sample and the second subcarrier phase sample such that the second subcarrier phase sample is greater than the first subcarrier phase sample.

24. The system of claim 23, wherein the at least one module is adapted to adjust at least one of the first subcarrier phase sample and the second subcarrier phase sample by adding 360 degrees, or the equivalent thereof, to the second subcarrier phase sample.

25. A video processing system comprising:
a video input interface adapted to receive encoded video information from a communication system;
a video decoder module adapted to decode received encoded video information and output decoded video information, wherein the video decoder module is adapted to:
determine a weighting factor based, at least in part, on a video synchronization signal;
obtain a first subcarrier phase sample;
obtain a second subcarrier phase sample; and
determine video subcarrier phase by, at least in part, interpolating between the first subcarrier phase sample and the second subcarrier phase sample, wherein the interpolating is based, at least in part, on the weighting factor; and
a video output interface adapted to receive decoded video information and generate at least one display driver signal corresponding to the decoded video information.

26. The video processing system of claim 25, wherein the video decoder module comprises:
a first module adapted to receive a composite video signal, determine horizontal synchronization for the video signal, and generate the weighting factor;
a second module adapted to separate luma and chroma signals from the composite video signal; and
a third module adapted to:
receive the weighting factor from the first module;
receive one or more chroma signals from the second module; and
demodulate the received chroma signal(s) utilizing the received weighting factor to interpolate between subcarrier phase samples.

27. The video processing system of claim 25, wherein the video processing system comprises at least one of: a cable television receiver and a satellite television receiver.

* * * * *